(12) United States Patent
Huang et al.

(10) Patent No.: US 9,529,381 B2
(45) Date of Patent: Dec. 27, 2016

(54) TOUCH PANEL

(71) Applicant: TPK TOUCH SOLUTIONS (XIAMEN) INC., Xiamen (CN)

(72) Inventors: Li Huang, Putian (CN); Tsung-Ke Chiu, Tainan (TW); Huilin Ye, Zhangzhou (CN); Jing Yu, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 137 days.

(21) Appl. No.: 14/468,050

(22) Filed: Aug. 25, 2014

(65) Prior Publication Data

US 2015/0062463 A1    Mar. 5, 2015

(30) Foreign Application Priority Data

Aug. 30, 2013   (CN) .......................... 2013 1 0388373

(51) Int. Cl.
*G06F 3/041*      (2006.01)
*G06F 1/16*       (2006.01)
*G06F 3/042*      (2006.01)

(52) U.S. Cl.
CPC ............... *G06F 1/16* (2013.01); *G06F 1/1684* (2013.01); *G06F 3/041* (2013.01); *G06F 3/042* (2013.01); *G06F 3/0412* (2013.01); *G09G 2360/144* (2013.01)

(58) Field of Classification Search
CPC ........ G06F 1/16; G06F 3/0412; G06F 1/1684; G06F 3/041; G06F 3/042; G09G 2360/144
See application file for complete search history.

(56) References Cited

U.S. PATENT DOCUMENTS

| 7,683,309 B1 * | 3/2010 | Chen ..................... H01L 31/101 250/214 AL |
| 2014/0062912 A1 * | 3/2014 | Lien ..................... G06F 3/0412 345/173 |

* cited by examiner

*Primary Examiner* — Ariel Balaoing
(74) *Attorney, Agent, or Firm* — Paul Bendemire

(57) ABSTRACT

A touch panel is provided. The touch panel includes a first substrate and a luminous flux adjusting portion. The first substrate has a top surface, in which the top surface has at least one semi-transparent area. The luminous flux adjusting portion is disposed on the first substrate and located in the at least one semi-transparent area, in which the luminous flux adjusting portion has a continuous light-impermissible pattern. Embodiments of the present invention uses the luminous flux adjusting portion to control the luminous flux of the semi-transparent area for achieving good consistence and adjustability of the luminous flux of the semi-transparent area.

21 Claims, 11 Drawing Sheets

TOUCH PANEL

BACKGROUND OF THE INVENTION

This application claims priority to China Application Serial Number 201310388373.6, filed Aug. 30, 2013, which is herein incorporated by reference.

FIELD OF THE INVENTION

The present invention relates to touch control technology, more particular to a touch panel.

DESCRIPTION OF THE RELATED ART

With development of touch sensing technology, touch panels are generally used in various consumer electronics, such as mobile electronics including a smart phone, a tablet computer, a camera, an electronic book, MP3 player, and display screen used for operating control equipments.

In a traditional touch panel, an ambient light sensor (ALS) hole or an infrared ray (IR) hole, etc. is generally formed in a non-touch area of the traditional touch panel, and the non-touch area corresponding to a position for opening the hole is generally formed as a semi-transparent area for meeting requirements of luminous flux of the ALS hole or the IR hole. In a traditional fabrication method of a touch panel, the semi-transparent area is formed by covering a corresponding area with a semi-transparent ink layer, in which the semi-transparent ink layer is often formed by blending opaque ink with transparent ink.

However, because there are fault tolerances among optical properties of different batches of ink, it is very difficult to precisely adjust parameters of the opaque ink and the transparent ink for forming the semi-transparent ink. Therefore, the quality of the semi-transparent ink obtained at each time of preparation is not consistent, and the quality of the luminous flux of the corresponding semi-transparent area is also not consistent.

BRIEF SUMMARY OF THE DISCLOSURE

This disclosure provides a touch panel. The touch panel uses a luminous flux adjusting portion in a semi-transparent area to control luminous flux of the semi-transparent area, in which the luminous flux adjusting portion has a continuous light-impermissible pattern or a continuous light-permissible pattern. Because areas and shapes of the light-impermissible pattern and the light-permissible pattern can be adjusted in accordance with requirements for different luminous fluxes, the luminous flux of the semi-transparent area has good consistence and adjustability.

According to an embodiment of the present invention, a touch panel is provided. The touch panel includes a first substrate and a luminous flux adjusting portion. The first substrate has a top surface, in which the top surface has at least one semi-transparent area. The luminous flux adjusting portion is disposed on the first substrate and located in the semi-transparent area, in which the luminous flux adjusting portion has a continuous light-impermissible pattern.

According to another embodiment of the present invention, a touch panel is provided. The touch panel includes a first substrate and a luminous flux adjusting portion. The first substrate has a top surface, in which the top surface has at least one semi-transparent area. The luminous flux adjusting portion is disposed on the first substrate and located in the semi-transparent area, in which the luminous flux adjusting portion has a continuous light-permissible pattern.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION OF THE DISCLOSURE

Figure 1A:
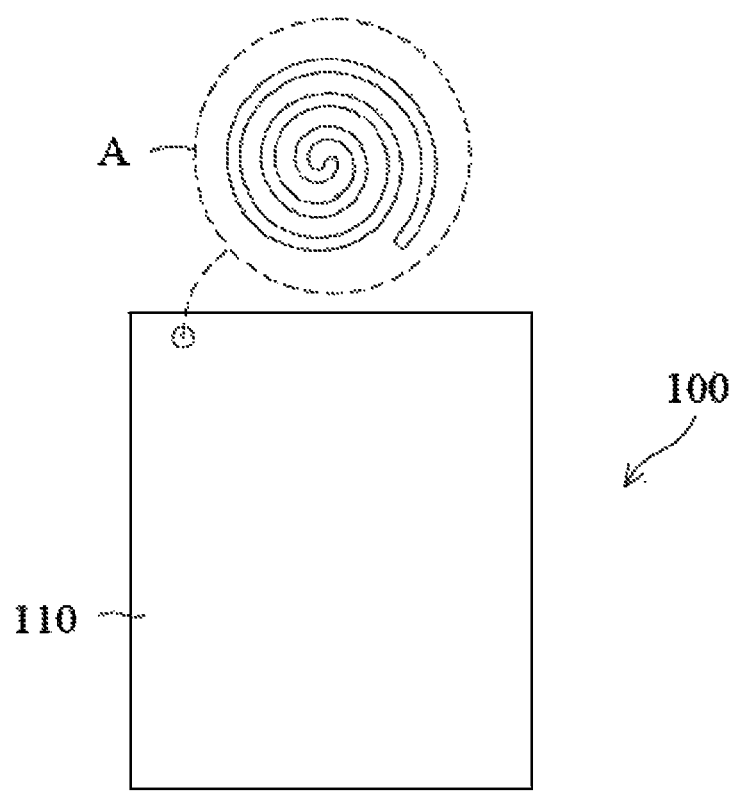
FIG. 1A illustrates a diagram showing a semi-transparent area in a touch panel and an enlarged diagram showing the semi-transparent area in accordance with an embodiment of the present invention.

The following disclosure provides different embodiments for implementing different features of various embodiments. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed Referring to FIG. 1A, FIG. 1A illustrates a diagram showing a semi-transparent area A in a touch panel 100 and an enlarged diagram showing the semi-transparent area A in accordance with an embodiment of the present invention. In this embodiment, the touch panel 100 includes a first substrate 110 and a luminous flux adjusting portion 120. The first substrate 110 has a top surface S1 and a bottom surface S2 (not shown in FIG. 1A, please refer to FIG. 1B auxiliary), and the top surface S1 has one semi-transparent area A. It is noted that the number of the semi-transparent areas A can be determined in accordance with the number of functional holes, such as ambient light sensor (ALS) holes or infrared ray (IR) holes, and thus the number of the semi-transparent areas A is not limited to one. In other embodiments, plural semi-transparent areas A may be used.

A luminous flux adjusting portion 120 is located in the semi-transparent areas A, in which the semi-transparent area A has one continuous light-impermissible pattern 1201. It is understood that except the portion having the light-impermissible pattern 1201, the other portion of the semi-transparent area A is a light-permissible area 1202. By adjusting a ratio of an area of the light-impermissible pattern 1201 to an area of the semi-transparent area A, the luminous flux emitted to the semi-transparent area A can be adjusted.

Specifically, when the area of the light-impermissible pattern 1201 in the semi-transparent area A is getting greater, less light is allowed to pass through the semi-transparent area A, and thus the luminous flux is getting decreased. In contrast, when the area of the light-impermissible pattern 1201 in the semi-transparent area A is getting smaller, more light is allowed to pass through the semi-transparent area A, and thus the luminous flux is getting increased. Therefore, the area ratio of the light-impermissible pattern 1201 to the semi-transparent area A is in an inverse-proportion to the luminous flux. Requirements for different luminous flux can be met through adjustment and arrangement of the luminous flux adjusting portion 120. In addition, details related to the different luminous flux requirements with different functional holes will be described later by using plural embodiments and thus are not described herein.

It is noted that, in one embodiment, an optical density of the luminous flux adjusting portion 120 is smaller than 3.

Figure 1B:
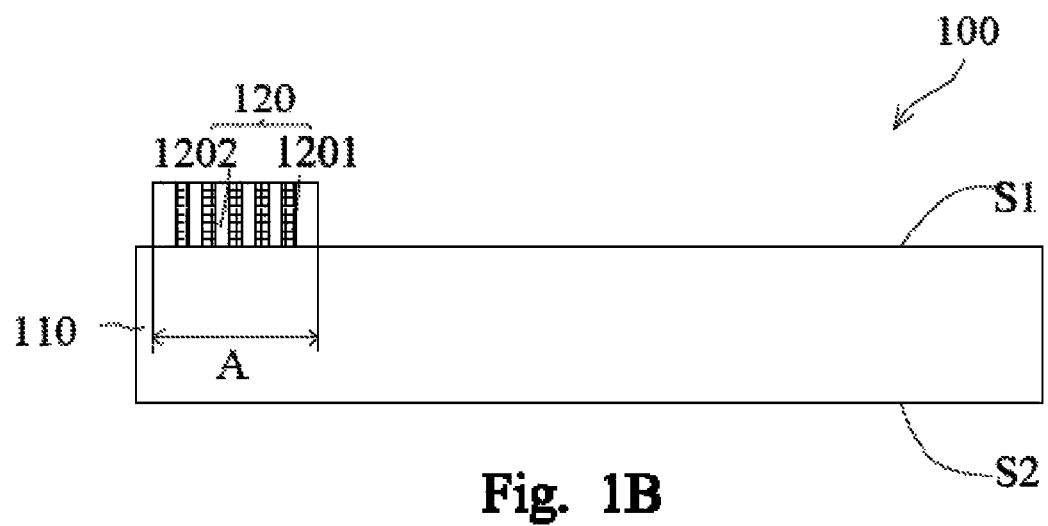
FIG. 1B is a cross-sectional view showing a semi-transparent area in the touch panel in accordance with an embodiment of the present invention.

Referring to FIG. 1B, FIG. 1B is a cross-sectional view showing the semi-transparent area A in the touch panel 100 in accordance with an embodiment of the present invention. The luminous flux adjusting portion 120 is formed from a not entire light-permissible material, such as ink or opaque polyimide. The light-impermissible pattern 1201 is formed by a printing method or a lithographic method. Specifically, when the ink material is used to form the luminous flux adjusting portion 120, the printing method is used to form corresponding light-impermissible pattern 1201 and corresponding light-permissible area 1202. When the polyimide material is used to form the luminous flux adjusting portion 120, the lithographic method is used to form corresponding light-impermissible patterns 1201 and corresponding light-permissible area 1202.

Figure 1C:
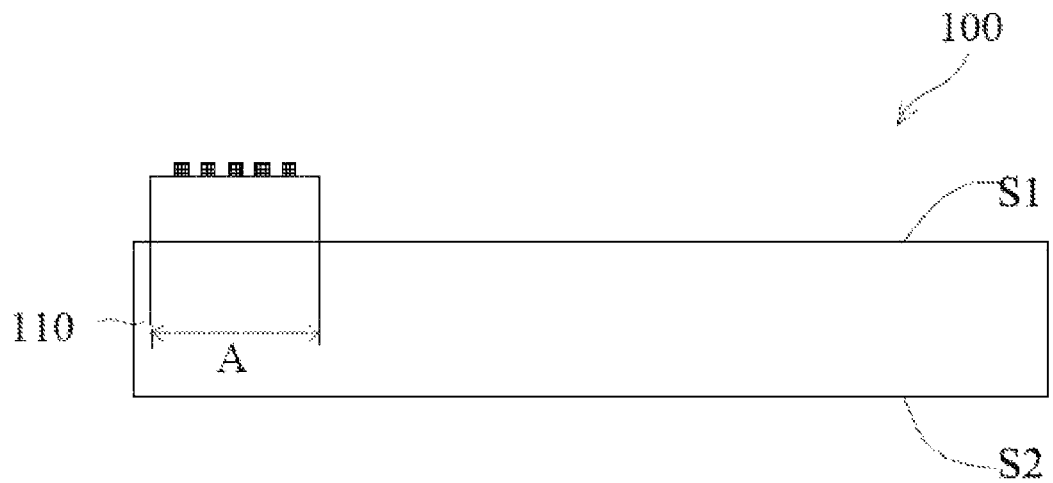
FIG. 1C is a cross-sectional view showing a semi-transparent area in the touch panel in accordance with an embodiment of the present invention.

It is noted that the structure of the luminous flux adjusting portion 120, and the method for forming the light-impermissible pattern 1201 are not limited thereto. Referring to FIG. 1C, in other embodiments, the luminous flux adjusting portion 120 can be formed from a light-permissible material, such as Polyethylene terephthalate, glass, Polycarbonate, or Polymethyl methacrylate. The corresponding light-impermissible pattern 1201 can be formed on the luminous flux adjusting portion 120 by printing technology, etching, coating or deposition.

Figure 2A:
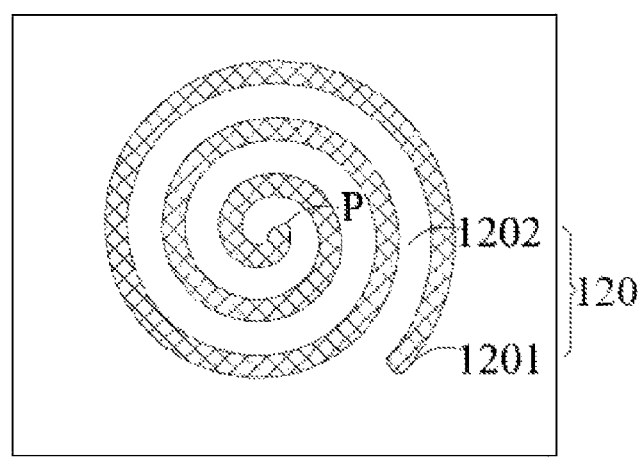
FIG. 2A is a top view showing a semi-transparent area in the touch panel in accordance with an embodiment of the present invention.

Referring to FIG. 2A, FIG. 2A is a top view showing the semi-transparent area A in the touch panel 100 in accordance with an embodiment of the present invention. The light-impermissible pattern 1201 is a spiral pattern constructed by a continuous patterning line, in which the patterning line has a starting point P. In one embodiment, the light-impermissible pattern 1201 is disposed at a center of the luminous flux adjusting portion 120. In another embodiment, the starting point P is disposed at a center of the luminous flux adjusting portion 120.

Figure 2B:
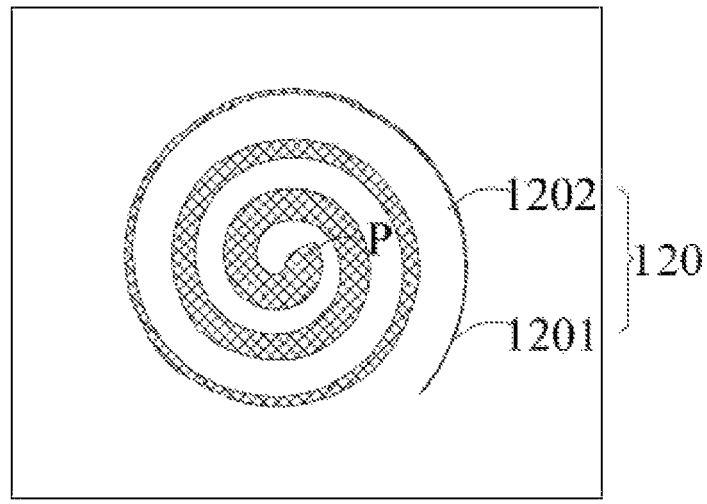
FIG. 2B is a top view showing a semi-transparent area in the touch panel in accordance with an embodiment of the present invention.

In an embodiment, the spiral shape of the light-impermissible pattern 1201 may have another variety. Referring to FIG. 2B, a line width of the spiral line of the spiral pattern is gradually decreased along the spiral line from the starting point P. Integrally speaking, the width of the spiral line is getting greater when the spiral line is closer to the starting point P, and the width of the spiral line is getting smaller when the spiral line is farther away from the starting point P, and the width of the end of the spiral line may even approach to 0.

Figure 2C:
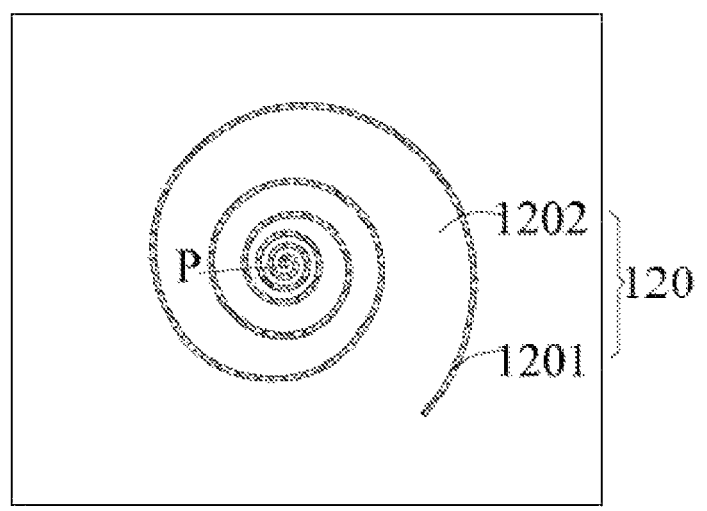
FIG. 2C is a top view showing a semi-transparent area in the touch panel in accordance with an embodiment of the present invention.

Similarly, the distribution density of the spiral line of the light-impermissible pattern 1201 also may have another variety. Referring to FIG. 2C, the distribution density of the spiral line is gradually decreased along the spiral line from the starting point P. Integrally speaking, the distribution density of the spiral line is getting greater when the spiral line is closer to the starting point P, and the distribution density of the spiral line is getting smaller when the spiral line is farther away from the starting point P. The distribution density of inner portion of the spiral pattern is greater, and the distribution density of outer portion of the spiral pattern is smaller.

Figure 3A:
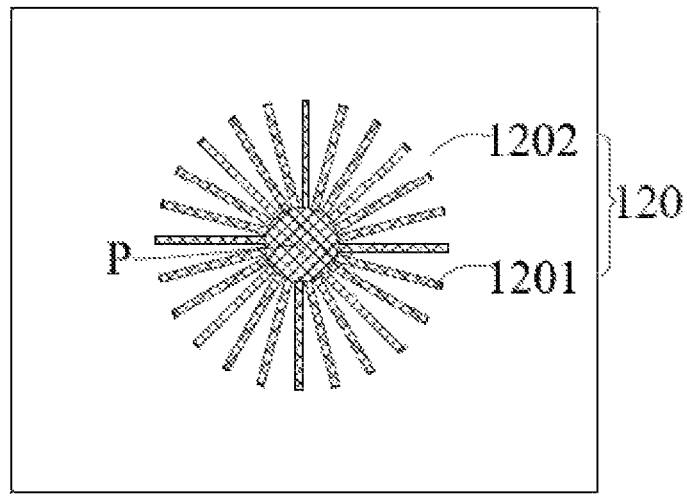
FIG. 3A is a top view showing a semi-transparent area in the touch panel in accordance with an embodiment of the present invention.

Referring to FIG. 3A, FIG. 3A is a top view showing a semi-transparent area A in a touch panel 100 in accordance with an embodiment of the present invention. In another embodiment, a light-impermissible pattern 1201 is a radiating pattern constructed by a continuous patterning line, in which the patterning line has a starting point P. In one embodiment, the light-impermissible pattern 1201 is disposed at a center of the luminous flux adjusting portion 120.

In another embodiment, the starting point P is disposed at a center of the luminous flux adjusting portion 120.

Figure 3B:
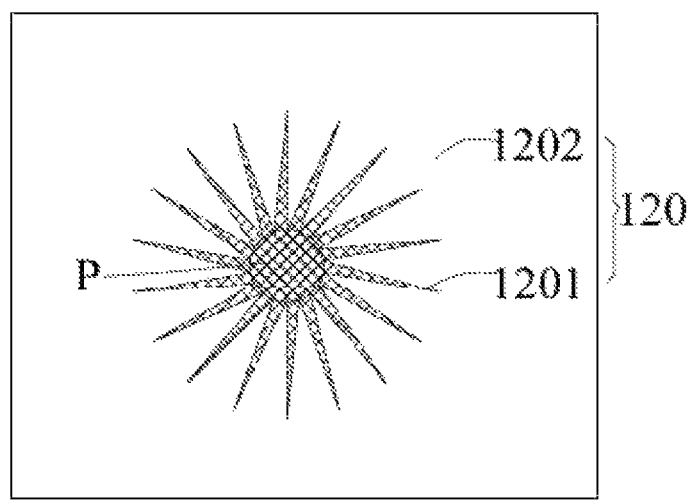
FIG. 3B is a top view showing a semi-transparent area in the touch panel in accordance with an embodiment of the present invention.

In an embodiment, the radiating shape of the light-impermissible pattern 1201 may have another variety. Referring to FIG. 3B, a line width of the radiating line of the radiating pattern is gradually decreased along the radiating line from the starting point P. Integrally speaking, the width of the radiating line is getting greater when the radiating line is closer to the starting point P, and the width of the radiating line is getting smaller when the radiating line is farther from the starting point P, and the width of the end terminal of the radiating line even approaches 0.

Figure 3C:
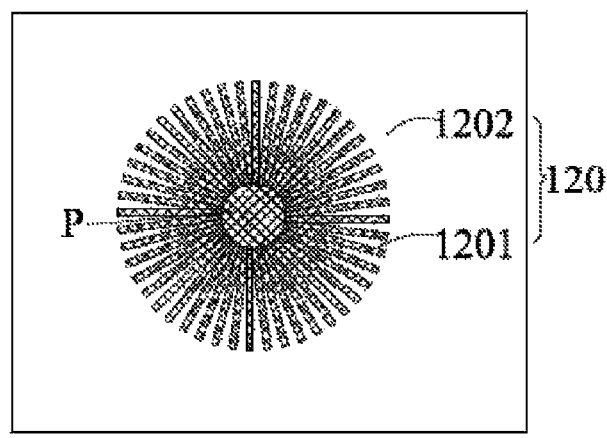
FIG. 3C is a top view showing a semi-transparent area in the touch panel in accordance with an embodiment of the present invention.

Similarly, the distribution density of the radiating line of the light-impermissible pattern 1201 also may have another variety. Referring to FIG. 3C, the distribution density of the radiating line is gradually decreased along the radiating line from the starting point P. When the radiating line is closer to the starting point P, the distribution density of the radiating line is getting greater, and when the radiating line is farther from the starting point P, the distribution density of the radiating line is getting smaller. The distribution density of inner portion of the radiating pattern is greater, and the distribution density of outer portion of the radiating pattern is smaller.

Figure 4:
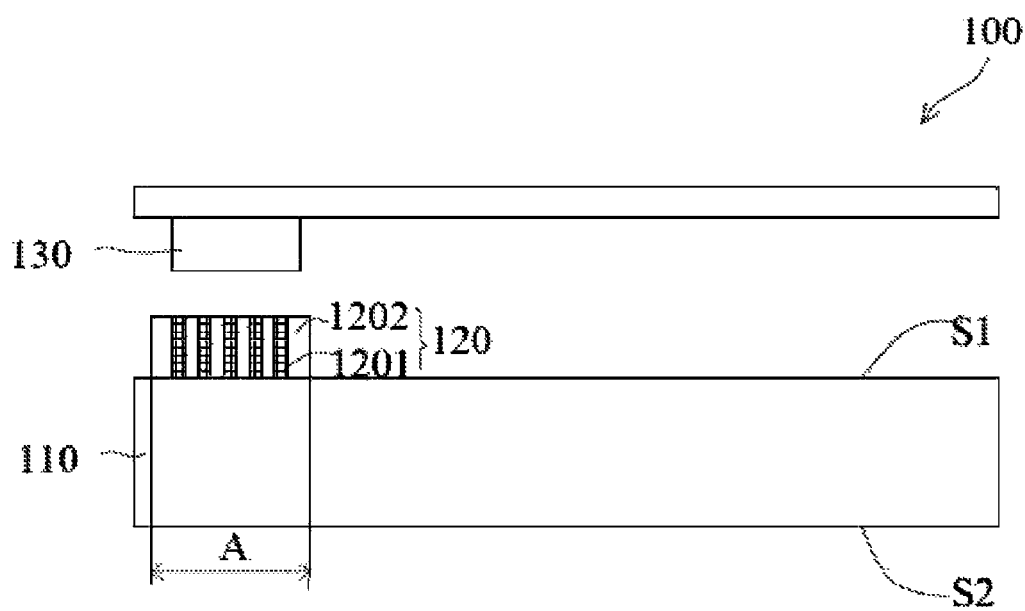
FIG. 4 is a cross-sectional view showing a touch panel in accordance with an embodiment of the present invention.

Referring to FIG. 4, FIG. 4 is a cross-sectional view showing a touch panel 100 in accordance with an embodiment of the present invention. The touch panel 100 further includes a light sensor 130, and the light sensor 130 is disposed above a luminous flux adjusting portion 120. In one embodiment, the light sensor 130 is disposed right above the luminous flux adjusting portion 120. It is noted that the function of the light sensor 130 is varied when a functional hole formed in the semi-transparent area A is varied. In the following descriptions, embodiments are introduced to specifically explain relationships between different functional holes and light sensors 130.

In an embodiment, when the functional hole is an ambient light sensor (ALS) hole, the light sensors 130 is used to detect the luminous flux of visible light emitting to the semi-transparent area A. Specifically, when ambient light is sufficient, the light emitting to the semi-transparent area A has a higher luminous flux, and when the ambient light is insufficient, the light emitting to the semi-transparent area A has a lower luminous flux. Therefore, the light intensity of the touch panel 100 can be adjusted in accordance with the luminous flux detected by the light sensors 130. Specifically, the touch panel 100 has a greater light intensity when the ambient light is sufficient, and the touch panel 100 has a smaller light intensity when the ambient light is insufficient, thereby preventing a screen of the touch panel 100 from being affected by the ambient light.

In other embodiments, when the functional hole is a infrared ray (IR) hole, the light sensor 130 is used to detect the luminous flux of infrared rays emitted to the semi-transparent area A. For example, when a user answers a phone call, face of the human may touch surface of the touch panel 100. At this moment, because a distance between the human face and the surface of the touch panel 100 is decreased, amount of the infrared rays emitted from human body to the IR hole is increased accordingly, and a controller (not shown) determines if power of the touch panel 100 is need to be turned off in accordance with requirements of the touch panel 100, thereby preventing the touch panel 100 from being touched by mistake when the user answers the phone call and face of the user touches the surface of the touch panel 100, thus preventing the normal operation of the touch panel 100 from being affected.

As mentioned above, the luminous flux of the semi-transparent area A has a requirement because of the light sensor 130. The requirement is realized by ensuring that the user cannot see the light sensor 130 when watching the entire outlook of the touch panel 100, and by ensuring the light having a certain of luminous flux can pass through the semi-transparent area A to enable the light sensor 130 to perform corresponding functions. In one embodiment, the luminous flux can be adjusted by controlling a ratio of an area of the light-impermissible pattern 1201 in the semi-transparent area A to an area of the semi-transparent area A. For example, when the ratio of the area of the light-impermissible pattern 1201 to the area of the semi-transparent area A is in a range from 45% to 85%, the requirement is met.

Figure 5:
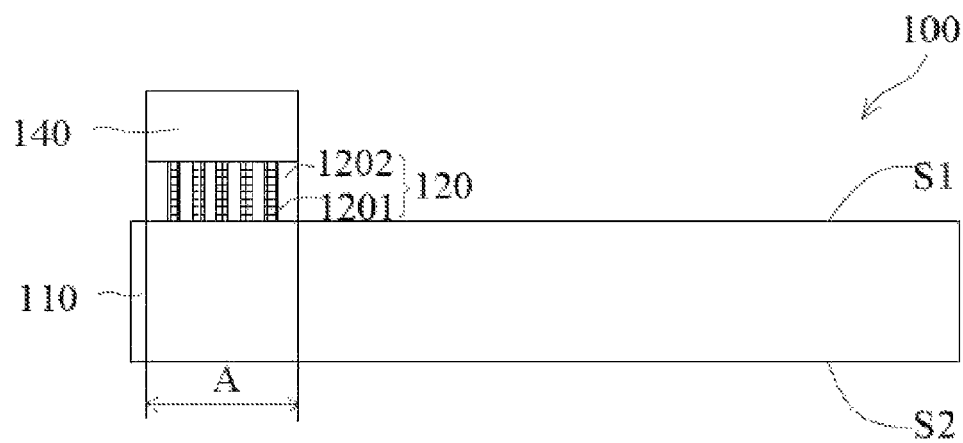
FIG. 5 is a cross-sectional view showing a touch panel in accordance with an embodiment of the present invention.

Referring to FIG. 5, FIG. 5 is a cross-sectional view showing a touch panel 100 in accordance with an embodiment of the present invention. The touch panel 100 further includes a colored ink layer 140 disposed above the luminous flux adjusting portion 120. The colored ink layer 140 is used to reflect light emitted from the semi-transparent area A. In an embodiment, the colored ink layer 140 can be formed on the luminous flux adjusting portion 120. The color of the colored ink layer 140 is not limited thereto. The color of the colored ink layer 140 is different from that of the luminous flux adjusting portion 120, so as to enable the color of the semi-transparent area A to be different from that of the luminous flux adjusting portion 120. Besides single color, dual colors, and triple colors, the color of the colored ink layer 140 may be further designed to gradient colors, so as to enable the colored ink layer 140 to have a 3-D effect when being irradiated. In addition, the colored ink layer 140 can be used to fabricate various patterns by printing, such as words, trademarks, or company names, thereby having quality and uniqueness.

Therefore, when plural colored ink layers 140 are respectively formed behind different semi-transparent areas A, the luminous flux adjusting portion 120 is used to control the luminous flux to enable each of the semi-transparent areas A to have different light luminous fluxes, an thus the colored ink layers 140 behind the different semi-transparent areas A produce different visual effects when being irradiated, thereby enabling the touch panel 100 to have diversified appearances.

Figure 6:
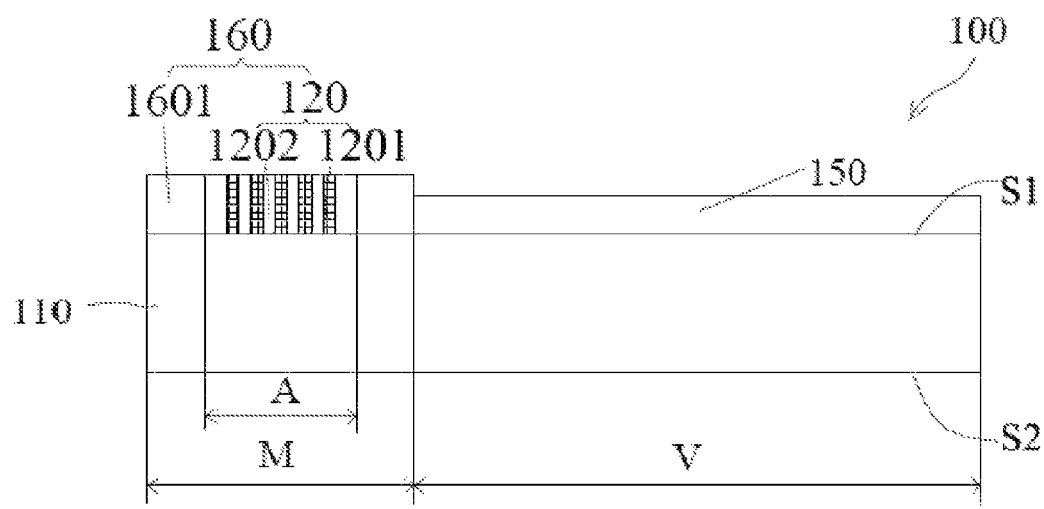
FIG. 6 is a cross-sectional view showing a touch panel in accordance with an embodiment of the present invention.

Referring to FIG. 6, FIG. 6 is a cross-sectional view showing a touch panel 100 in accordance with an embodiment of the present invention. The touch panel has a sensing area V and at least one peripheral area M disposed at a side of the sensing area V, in which at least one semi-transparent area A is defined in the peripheral area M. The touch panel 100 further includes a sensing electrode layer 150 formed on the first substrate 110 and located in the sensing area V. In one embodiment, the sensing electrode layer 150 may be extended into the peripheral area M. It is noted that the sensing electrode layer 150 may be formed on another substrate in other embodiments, which will be described later by using another embodiment and thus is not described herein.

The touch panel 100 further includes a shelter layer 160. The shelter layer 160 is disposed in the peripheral area M. Because the shelter layer 160 has a sheltering effect, the shelter layer 160 is generally used to shelter the peripheral components (not shown) of the touch panel 100 so as to beautify the touch panel 100. The shelter layer 160 has a shelter portion 1601 and the luminous flux adjusting portion 120. The luminous flux adjusting portion 120 is disposed in the semi-transparent area A and used to adjust the luminous flux of the semi-transparent area A. It is understood that, except the portion that has the luminous flux adjusting portion 120 disposed in the semi-transparent area A, the other portion of the shelter layer 160 is the shelter portion 1601. The shelter portion 1601 is disposed in the peripheral area M outside the semi-transparent area A, so as to shelter the peripheral components of the touch panel 100. The light density of the corresponding shelter portion 1601 has to be greater than 3 for meeting the corresponding shelter requirements.

It is noted that the material forming the shelter portion 1601 of the shelter layer 160 can be the same with that forming the luminous flux adjusting portion 120 in this embodiment, such as ink or polyimide, etc. When the ink material is adopted to form the shelter portion 1601 and the luminous flux adjusting portion 120, a printing method can be used to form the corresponding shelter portion 1601 and luminous flux adjusting portion 120. When the polyimide material is adopted to form the shelter portion 1601 and the luminous flux adjusting portion 120, a lithographic method can be used to form the corresponding shelter portion 1601 and luminous flux adjusting portion 120. When the lithographic method is used, different modifications can be made on the same mask in accordance with the difference between the shelter portion 1601 and the luminous flux adjusting portion 120, so as to complete the fabrication of the shelter portion 1601 and the luminous flux adjusting portion 120.

Figure 7:
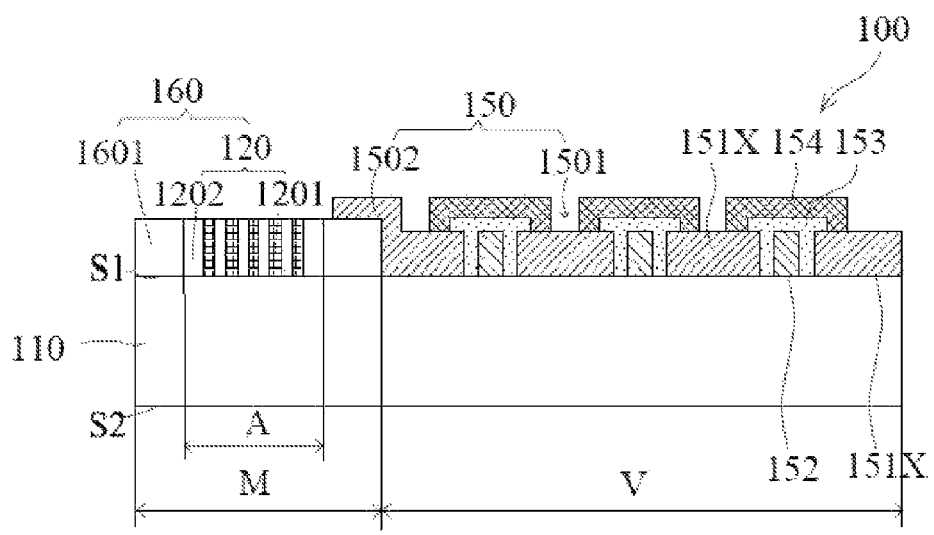
FIG. 7 is a cross-sectional view showing a touch panel in accordance with an embodiment of the present invention.

Referring to FIG. 7, FIG. 7 is a cross-sectional view showing a touch panel 100 in accordance with an embodiment of the present invention. In this embodiment, both of the sensing electrode layer 150 and the shelter layer 160 are located on the top surface S1 of the first substrate 110. In addition to a sensing portion 1501 located in the sensing area V, the sensing electrode layer 150 further includes an extended portion 1502 extended into the peripheral area M.

In this embodiment, the extended portion 1502 is bonded on the shelter layer 160 to be electrically connected to the subsequent peripheral circuits (not shown), so as to transmit touch signals generated by the sensing electrode layer 150 to a controller (not shown). It is noted that the positional relationship between the sensing electrode layer 150 and the shelter layer 160 is not limited thereto. In other embodiments, the extended portion 1502 of the sensing electrode layer 150 can be directly formed between the first substrate 110 and the shelter layer 160, and then an additional electrical connection portion is arranged to electrically connect the sensing electrode layer 150 with the peripheral components.

The sensing electrode layer 150 is located on the top surface S1 of the substrate 110, and has two electrodes arranged in different directions. Specifically, the sensing electrode layer 150 includes first electrodes 151X arranged in rows, second electrodes 151Y arranged in lines, and connection portions 152 used to connect the adjacent second electrodes 151Y, in which the first electrode 151X and the second electrode 151Y are insulated from each other. In addition, Insulator portions 153 are disposed on the respective connection portions 152 of the sensing electrode layer 150. In some embodiments, the material forming the insulator portions 153 is an organic material or an inorganic material, such as polyimide or epoxy. Cross connection portions 154 are disposed on the insulator portions 153. The cross connection portions 154 electrically connect the adjacent first electrodes 151X. The material forming the cross connection portions 154 can be a metal material such as silver or aluminum, a transparent conductor material such as indium tin oxide (ITO), or combinations thereof.

In this embodiment, hardness of the first substrate 110 can be increased through a strengthening process. Besides being used for supporting the sensing electrode layer 150 and the shelter layer 160, the first substrate 110 is further used to provide for protecting the sensing electrode layer 150, because a bottom surface S2 of the first substrate 110 is used as a touch surface for the user, the first substrate 110 is the outermost layer of the touch sense panel 100. If the first substrate 110 is not processed by the related strengthening process, the first substrate 110 is likely to be broken when the touch panel is accidentally dropped, and the sensing electrode layer 150 will be broken and thus loses its touch sensing function.

Figure 8:
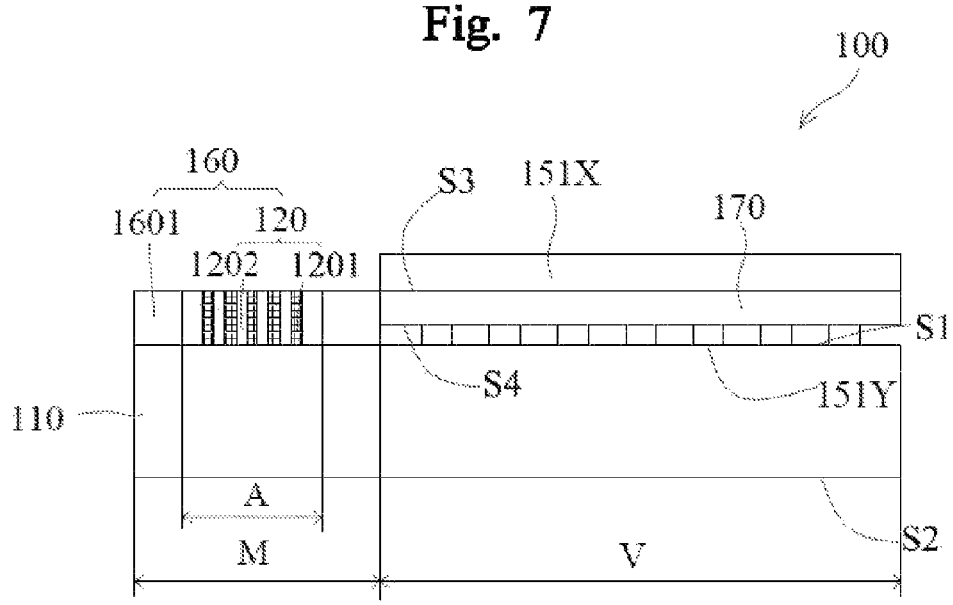
FIG. 8 is a cross-sectional view showing a touch panel in accordance with an embodiment of the present invention.

Referring to FIG. 8, FIG. 8 is a cross-sectional view showing a touch panel 100 in accordance with an embodiment of the present invention. In this embodiment, the sensing electrode layer 150 and the shelter layer 160 are disposed on different substrates. The touch panel 100 further includes a second substrate 170. The sensing electrode layer 150 has two electrodes arranged in different directions. Specifically, the sensing electrode layer 150 includes first electrodes 151X arranged in rows and second electrodes 151Y arranged in lines. The first electrodes 151X are arranged on a top surface S3 of the second substrate 170, and at least one portion of the first electrodes 151X is located in the sensing area V. The second electrodes 151Y are disposed on a bottom surface S4 of the second substrate 170, and at least one portion of the second electrodes 151Y is located in the sensing area V. It is noted that the sensing electrode layer 150 is not limited to the arrangement in which the electrodes are disposed in only one single direction on a surface of the second substrate 170. In other embodiments, the sensing electrode 150 can be arranged on the top surface S3 or the bottom surface S4 of the second substrate 170 in two different directions. The specific structure of the sensing electrode 150 has been described above, and thus the related details are not described again herein.

Figure 9:
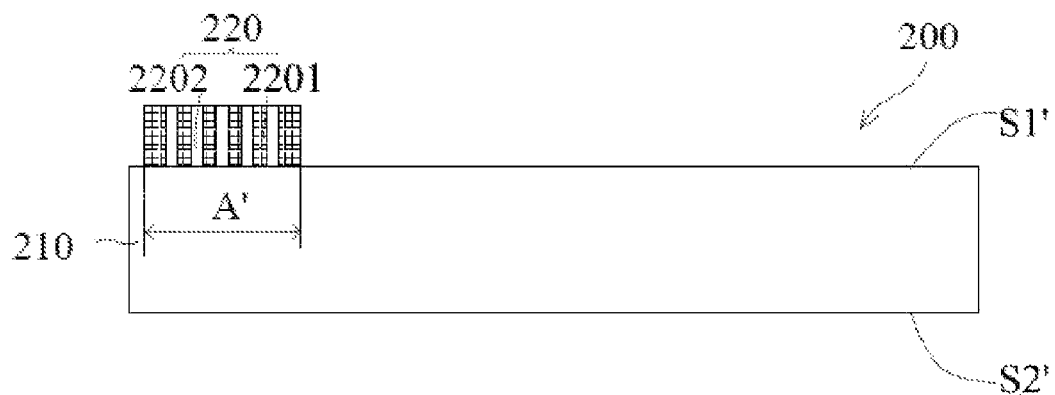
FIG. 9 is a cross-sectional view showing the semi-transparent area in the touch panel in accordance with another embodiment of the present invention.

Referring to FIG. 9, FIG. 9 is a cross-sectional view showing the semi-transparent area A' in the touch panel 200 in accordance with an embodiment of the present invention. The first substrate 210 has a top surface S1' and a bottom surface S2'. The top surface S1' has a semi-transparent areas A'. A luminous flux adjusting portion 220 is located in the semi-transparent areas A' in which the semi-transparent area A' has one continuous light-permissible pattern 2201. It is understood that, except the portion having the light-permissible pattern 2201, the other portion of the semi-transparent area A' is a light-impermissible area 2202. By adjusting a ratio of an area of the light-permissible pattern 2201 to an area of the semi-transparent area A', the luminous flux emitted to the semi-transparent area A' can be adjusted. Specifically, when the area of the light-permissible pattern 2201 in the semi-transparent area A' is getting greater, more light is allowed to pass through the semi-transparent area A' and the luminous flux is getting increased. In contrast, when the area of the light-impermissible pattern 2201 in the semi-transparent area A' is getting smaller, less light is allowed to pass through the semi-transparent area A' and the luminous flux is getting decreased. Therefore, the area ratio of the light-permissible pattern 2201 to the semi-transparent area A is in a proportion to the luminous flux. Demands for different luminous flux can be met through the adjustment and arrangement of the luminous flux adjusting portion 220.

Figure 10A:
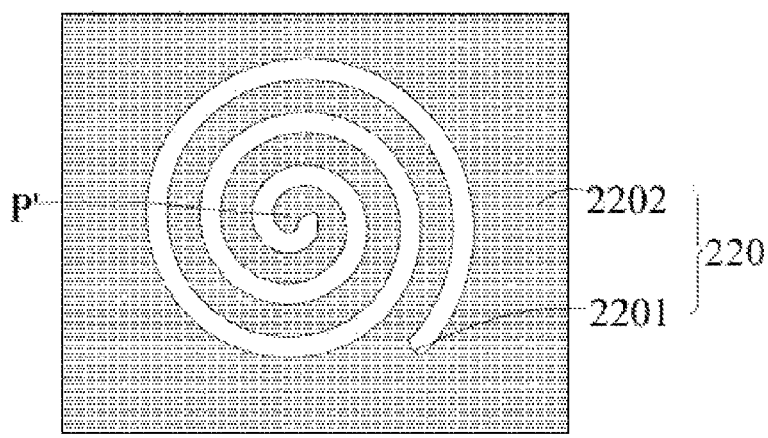
FIG. 10A is a top view showing a semi-transparent area in the touch panel in accordance with another embodiment of the present invention.

Referring to FIG. 10A, FIG. 10A is a top view showing the semi-transparent area A' in the touch panel 200 in accordance with an embodiment of the present invention. The light-permissible pattern 2201 is a spiral pattern constructed by a continuous patterning line, in which the patterning line has a starting point P'. In one embodiment, the light-permissible pattern 2201 is disposed at a center of the luminous flux adjusting portion 220. In another embodiment, the starting point P' is disposed at a center of the luminous flux adjusting portion 220.

Figure 10B:
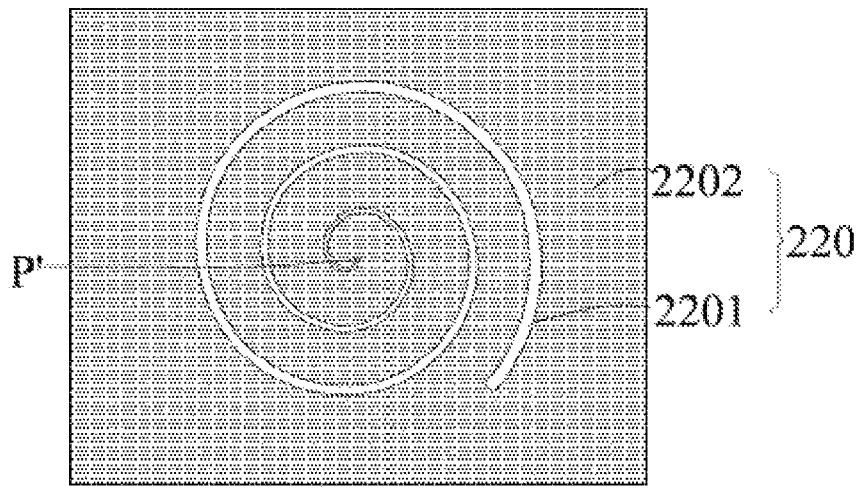
FIG. 10B is a top view showing a semi-transparent area in the touch panel in accordance with another embodiment of the present invention.

In an embodiment, the spiral shape of the light-permissible pattern 2201 may have another variety. Referring to FIG. 10B, a line width of the spiral line of the spiral pattern is gradually increased along the spiral line from the starting point P'. Integrally speaking, the width of the spiral line is getting smaller when the spiral line is closer to the starting point P', and, the width of the spiral line is getting greater when the spiral line is farther away from the starting point P'. The width of the starting point P' of the spiral line even approaches to 0.

Figure 10C:
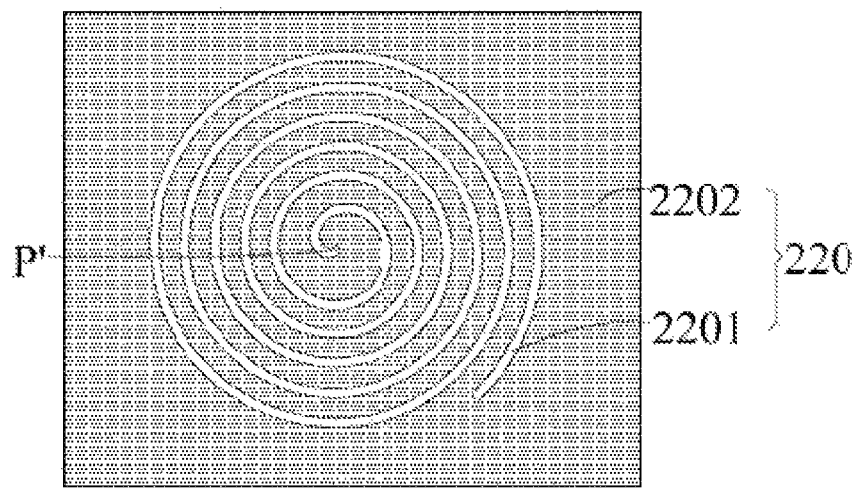
FIG. 10C is a top view showing a semi-transparent area in the touch panel in accordance with another embodiment of the present invention.

Similarly, the distribution density of the spiral line of the light-permissible pattern 2201 also may have another variety. Referring to FIG. 10C, distribution density of the spiral line is gradually increased along the spiral line from the starting point P'. Integrally speaking, the distribution density of the spiral line is getting smaller when the spiral line is closer to the starting point P', and the distribution density of the spiral line is getting greater when the spiral line is farther away from the starting point P'. The distribution density of inner portion of the spiral pattern is smaller, and the distribution density of outer portion of the spiral pattern is greater.

Figure 11A:
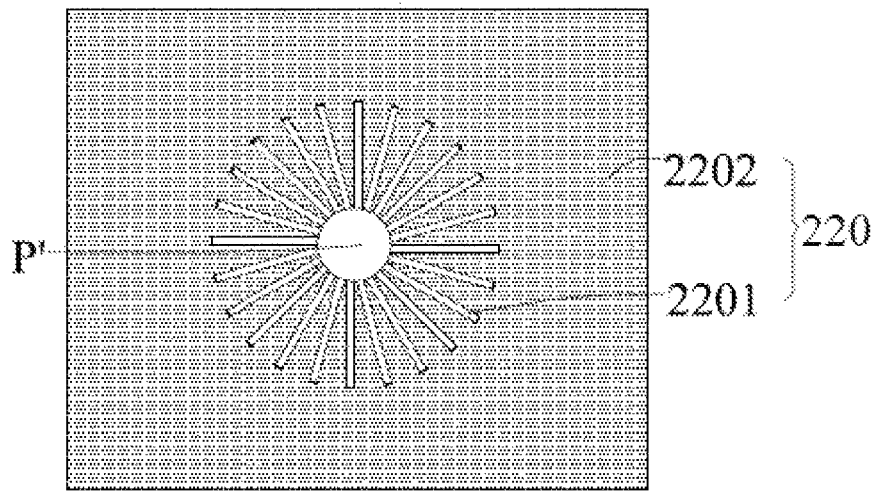
FIG. 11A is a top view showing a semi-transparent area in the touch panel in accordance with another embodiment of the present invention.

Referring to FIG. 11A, FIG. 11A is a top view showing a semi-transparent area A' in the touch panel 200 in accordance with an embodiment of the present invention. In another embodiment, the light-permissible pattern 2201 is a radiating pattern constructed by a continuous patterning line, in which the patterning line has a starting point P'. In one embodiment, the light-permissible pattern 2201 is disposed at a center of the luminous flux adjusting portion 220. In another embodiment, the starting point P is disposed at a center of the luminous flux adjusting portion 220.

Figure 11B:
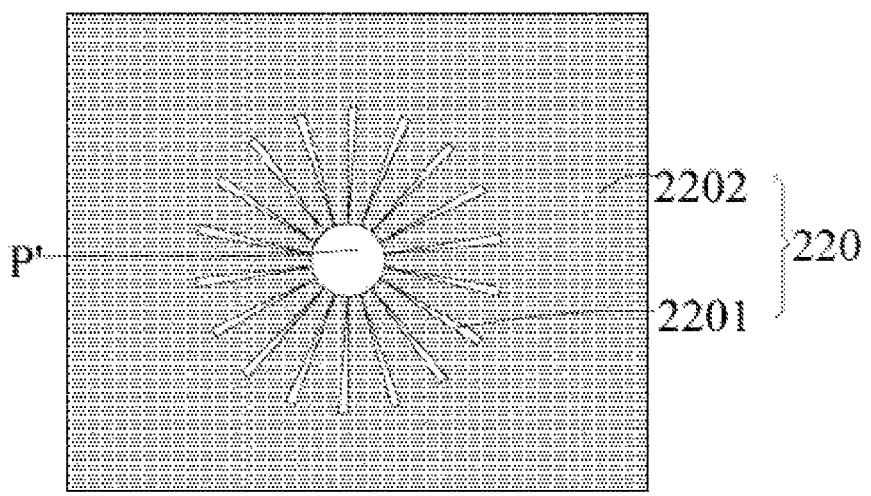
FIG. 11B is a top view showing a semi-transparent area in the touch panel in accordance with another embodiment of the present invention.

In an embodiment, the radiating shape of the light-permissible pattern 2201 may have another variety. Referring to FIG. 11B, a line width of the radiating line of the radiating pattern is gradually increased along the radiating line from the starting point P'. Integrally speaking, when the radiating line is closer to the starting point P', the width of the radiating line is getting smaller, and when the radiating line is farther from the starting point P', the width of the radiating line is getting greater. The width of the beginning portion near the starting point P' of the radiating line may approach to 0.

Figure 11C:
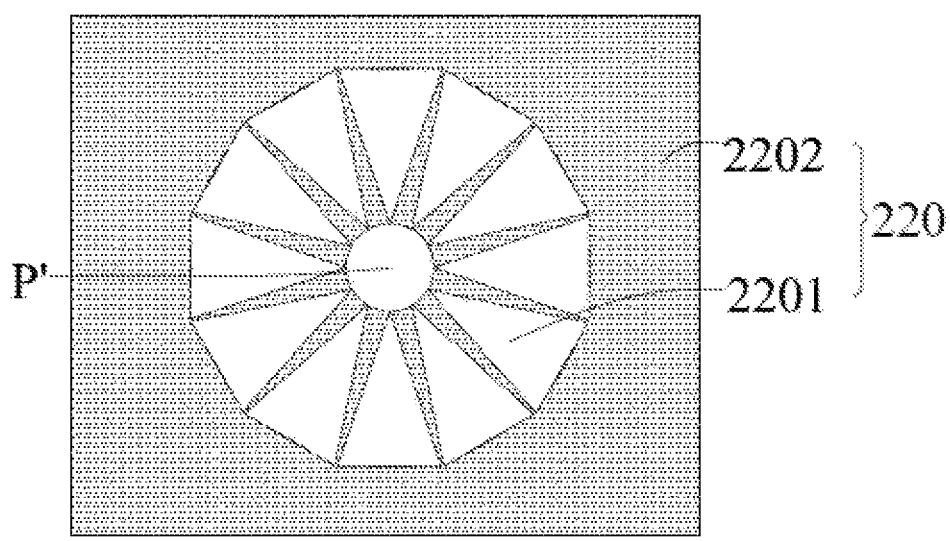
FIG. 11C is a top view showing a semi-transparent area in the touch panel in accordance with another embodiment of the present invention.

Similarly, the distribution density of the radiating line of the light-permissible pattern 2201 also may have another variety. Referring to FIG. 11C, the distribution density of the radiating line is gradually increased along the radiating line from the starting point P'. When the radiating line is closer to the starting point P', the distribution density of the radiating line is getting smaller, and when the radiating line is farther from the starting point P', the distribution density of the radiating line is getting greater. The distribution density of inner portion of the radiating pattern is smaller, and the distribution density of outer portion of the radiating pattern is greater.

It is noted that, in FIGS. 10A-11C, the starting point P' of the light-permissible pattern 2201 is used to illustrate the arrangement of the patterning line of the light-permissible pattern 2201 more graphically, and is not shown in the actual size.

In an embodiment, an optical density of the luminous flux adjusting portion 200 is smaller than 3.

In one embodiment, the luminous flux can be adjusted by controlling a ratio of an area of the light-permissible pattern 2201 the semi-transparent area A' to an area of the semi-transparent area A'. For example, when the ratio of the area of the light-permissible pattern 2201 to the area of the semi-transparent area A' is in a range from 15% to 55%, the requirements of the aforementioned functional holes can met.

In sum, embodiments of the present invention enable the luminous flux of the semi-transparent area A or A' to have good consistence and adjustability by arranging the luminous flux adjusting portion 120 or 220 and by adjusting an area and a shape of the continuous light-impermissible pattern 1201 or the continuous light-permissible pattern 2201 in accordance with the requirements of different luminous fluxes. In particular, in one aspect, the embodiments of the present invention can ensure the luminous flux adjusting function by providing a novel pattern design of the light-impermissible pattern 1201 or the light-permissible pattern 2201. In another aspect, the pattern can be used as an alignment mark in the fabrication process, so as to conveniently align and adhere the other components of the touch panel.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A touch panel, comprising:
    a first substrate having a top surface, wherein the top surface has at least one semi-transparent area; and
    a luminous flux adjusting portion disposed on the first substrate and located in the semi-transparent area, wherein the luminous flux adjusting portion has a continuous light-impermissible pattern, wherein the ratio of an area of continuous light-impermissible pattern to an area of the luminous flux adjusting portion is decreased from a center of the luminous flux adjusting portion outward.

2. The touch panel of claim 1, wherein an optical density of the luminous flux adjusting portion is smaller than 3.

3. The touch panel of claim 1, wherein the continuous light-impermissible pattern is a spiral pattern or a radiating pattern constructed by a continuous patterning line.

4. The touch panel of claim 3, wherein the continuous patterning line has a starting point, and a line width of the continuous patterning line is gradually decreased along the continuous patterning line from the starting point.

5. The touch panel of claim 3, wherein the continuous patterning line has a starting point, and a distribution density of the patterning line is gradually decreased along the continuous patterning line from the starting point.

6. The touch panel of claim 1, wherein a ratio of an area of the continuous light-impermissible pattern to an area of the semi-transparent area is in a range from 45% to 85%.

7. The touch panel of claim 1, further comprising a light sensor disposed above the luminous flux adjusting portion for sensing a luminous flux emitted to the semi-transparent area.

8. The touch panel of claim 1, further comprising colored ink layer disposed above the luminous flux adjusting portion to reflect light emitted from the semi-transparent area.

9. The touch panel of claim 1, further comprising a sensing electrode layer and a shelter layer, wherein the first substrate comprises a sensing area and at least one peripheral area which is disposed at a side of the sensing area, and the semi-transparent area is defined in the peripheral area;

at least one portion of the sensing electrode layer is located in the sensing area; and the shelter layer located in the peripheral area, wherein the shelter layer has a shelter portion and the luminous flux adjusting portion.

10. The touch panel of claim 9, wherein the sensing electrode layer and the shelter layer are located on the first substrate.

11. The touch panel of claim 10, further comprising a second substrate, wherein the sensing electrode layer is located on the second substrate, and the second substrate is located above the first substrate.

12. The touch panel of claim 10, wherein the first substrate is a strengthened substrate.

13. The touch panel of claim 11, wherein the material forming the second substrate comprises Polyethylene terephthalate, glass, Polycarbonate, or Polymethyl methacrylate.

14. The touch panel of claim 9, wherein an optical density of the shelter portion is greater than 3.

15. A touch panel, comprising:

a first substrate having a top surface, wherein the top surface has at least one semi-transparent area; and a luminous flux adjusting portion disposed on the first substrate and located in the semi-transparent area, wherein the luminous flux adjusting portion has a continuous light-permissible pattern, wherein the ratio of an area of continuous light-impermissible pattern to an area of the luminous flux adjusting portion is decreased from a center of the luminous flux adjusting portion outward.

16. The touch panel of claim 15, wherein an optical density of the luminous flux adjusting portion is smaller than 3.

17. The touch panel of claim 15, wherein the continuous light-permissible pattern is a spiral pattern or a radiating pattern, and the spiral pattern or the radiating pattern is constructed by a continuous patterning line.

18. The touch panel of claim 17, wherein the continuous patterning line has a starting point, and a line width of the continuous patterning line is gradually increased along the continuous patterning line from the starting point.

19. The touch panel of claim 17, wherein the continuous patterning line has a starting point, and distribution density of the continuous patterning line is gradually increased along the continuous patterning line from the starting point.

20. The touch panel of claim 15, wherein a ratio of an area of the continuous light-permissible pattern to an area of the semi-transparent area is in a range from 15% to 55%.

21. The touch panel of claim 1, wherein the luminous flux adjusting portion comprises:

a layer made of a light-permissible material formed on the top surface of the first substrate; and a continuous light-impermissible pattern formed on the layer.

* * * * *